J. W. BLAKEMORE.
OPERATING LEVER FOR LOW DOWN FLUSH TANKS.
APPLICATION FILED APR. 29, 1909.
963,855.
Patented July 12, 1910.
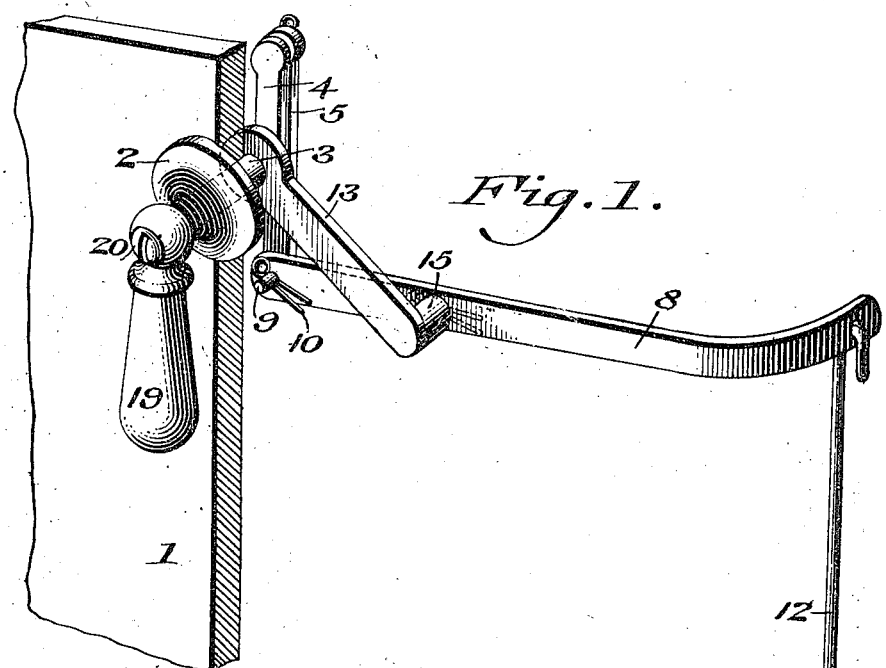
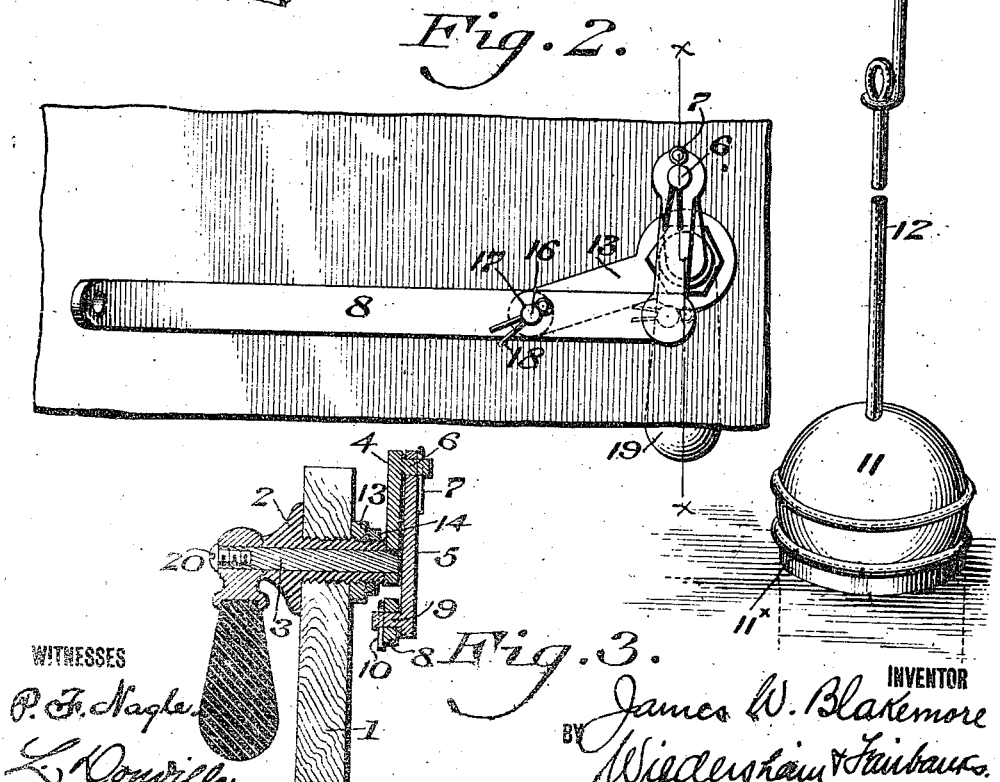
WITNESSES
P. F. Nagle
L. Douville
INVENTOR
James W. Blakemore
BY Wigglesworth & Fairbanks
ATTORNEYS

UNITED STATES PATENT OFFICE.

JAMES W. BLAKEMORE, OF BARNSBORO, NEW JERSEY, ASSIGNOR TO THOMAS J. BERKSTRESSER, OF PHILADELPHIA, PENNSYLVANIA.

OPERATING-LEVER FOR LOW-DOWN FLUSH-TANKS.

963,855.

Specification of Letters Patent. Patented July 12, 1910.

Application filed April 29, 1909. Serial No. 492,829.

*To all whom it may concern:*

Be it known that I, JAMES W. BLAKEMORE, a citizen of the United States, residing at Barnsboro, county of Gloucester, State of New Jersey, have invented a new and useful Operating-Lever for Low-Down Flush-Tanks, of which the following is a specification.

This invention relates to flush tank mechanisms and more particularly to that type of flush tank known as the "low down" tank and it has for an object to provide an operating mechanism, simple and economical in construction and one in which the relation of one part to another and the consequent adjustment of the flush valve may be varied as desired.

In flush tanks as heretofore constructed, it has been necessary to provide an additional opening in the tank for the purposes of properly fitting the valve operating lever and its adjuncts, whereby in the case of wear or accident, a shifting of the fulcrum becomes necessary, resulting in unnecessary expense and the services of a skilled workman.

In my present invention I have provided a mechanism whereby additional openings in the tank are avoided and in case it becomes necessary to shift the fulcrum from one point to another, the same may be readily done by those unskilled in the art and the matter of upkeep and expense reduced to a minimum.

For the purpose of illustrating my invention, I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a perspective of an apparatus embodying my invention, a portion of the tank being cut away for purposes of illustration. Fig. 2 represents a side elevation of a portion thereof showing the operating connections. Fig. 3 represents a section on line $x$—$x$, Fig. 2.

Similar numerals of reference indicate corresponding parts in the figures.

Referring to the drawings:—1 designates the front wall of a flush tank, the same preferably being of the type known as a "low down" flush tank, wherein, in the present instance, is screw threaded a bushing 2, the same forming a bearing for a spindle 3 passing therethrough, the end of which extends interiorly of the tank 1 and carries for rotation therewith a crank arm 4. This crank arm 4 is preferably pivotally connected to a link 5, the connection in the present instance consisting of a stud 6 integral with the crank arm 4 and suitably apertured to receive a cotter pin 7 for securing the parts in operative position.

8 designates a lever arm, in the present instance pivotally attached to the link 5 by means of a bearing stud 9 and held in position by a cotter pin 10. This lever arm 8 is of the usual type and has connection at one end to the valve member 11 by the rods 12 or other well known means, the function of the valve 11 being to control the outlet opening $11^x$.

As heretofore constructed, it has been necessary in order to provide a fulcrum for the lever arm 8, to make a second aperture in the tank 1, whereby the position of the arm and its movement are always the same and no adjustment whatsoever is possible for varying conditions. In my present invention in order to obviate such conditions, I have provided a fulcrum consisting of an arm 13 mounted upon the bushing 2 and fixedly secured in any desired position by means of a nut 14 or other equivalent device. This arm 13 is preferably provided with an off set 15 provided with a bearing stud 16 coöperating with an opening 17 in the lever 8, which latter is secured thereon by means of a cotter pin 18 or the like.

19 designates a suitable handle fixedly secured in any well known manner, as by a set screw 20, upon the spindle 3, the rotation of which causes crank arm 4 and adjacent connections to produce the necessary opening of the flush valve.

It will be apparent that by loosening the nut 14 the arm 13 may be shifted from one position to another and thus vary the fulcrum point of the lever 8 and change the relation of one part to another and the amount the valve member 11 is raised from the outlet $11^x$.

It will now be apparent that I have devised a novel and useful construction which embodies the features of advantage enumerated as desirable in the statement of the invention and the above description and while I have in the present instance shown and described the preferred embodiment thereof which has been found in practice to give satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:—

1. In a device of the character described, a spindle rotatably mounted upon a flush tank, a plurality of levers suitably connected for movement therewith, a valve member connected to one of said levers, and an arm secured to said flush tank for adjustment relative thereto and pivotally connected to said valve connected lever.

2. In a device of the character described, a spindle rotatably mounted upon a flush tank, a plurality of levers suitably connected for movement therewith, a valve member connected to one of said levers, an arm pivoted concentric of said spindle and having a pivotal connection with said valve connected lever, and means to maintain said arm in fixed position.

3. In a device of the character described, a bushing mounted in the wall of a flush tank, a spindle rotatably secured therein, a valve member, a lever connected thereto, an arm mounted on said bushing and pivotally connected to said lever intermediate the ends thereof, and operating means pivotally connected with said spindle and with the end of said lever on the opposite side of said pivotal support from said valve connection.

4. In a device of the character described, a bushing mounted in the wall of a flush tank, a spindle rotatably carried by said bushing, a valve member, a lever operatively connected thereto, an arm mounted on said bushing and pivotally connected to said lever, a plurality of crank arms between said lever and said spindle, and means to adjust said first named arm to vary the fulcrum point.

5. In a device of the character described, a spindle rotatably mounted in the wall of a flush tank, a crank arm on said spindle, a lever suitably connected to said crank arm, a valve member operatively secured to said lever, a bushing concentric with said spindle, an arm mounted on said bushing and pivotally connected to said lever, means to maintain said arm in fixed position and means to adjust and lock said arm to vary the fulcrum point.

6. In a device of the character described, a flush tank, a spindle rotatively mounted therein, lever mechanism, a valve operated by said lever mechanism, and a normally stationary member secured to said flush tank and having rotary adjustment relative thereto and pivotally connected to said lever mechanism.

7. In a device of the character described, a flush tank, a bushing passing through the tank wall, a spindle mounted in the bushing, lever mechanism, a valve operated by said lever mechanism and a normally stationary member secured to the bushing and having rotary adjustment relative to the tank and pivotally connected to said lever mechanism.

JAS. W. BLAKEMORE. [L. S.]

Witnesses:
WM. F. REX,
EMMET BLACK.